(12) United States Patent
Singaraju et al.

(10) Patent No.: US 10,382,252 B2
(45) Date of Patent: Aug. 13, 2019

(54) FILTERING WITHIN DEVICE MANAGEMENT PROTOCOL QUERIES

(75) Inventors: Gouri Sankar Singaraju, Bangalore (IN); Vivek Singh, Mathura (IN)

(73) Assignee: Juniper Networks, Inc., Sunnyvale, CA (US)

( * ) Notice: Subject to any disclaimer, the term of this patent is extended or adjusted under 35 U.S.C. 154(b) by 1614 days.

(21) Appl. No.: 13/533,753

(22) Filed: Jun. 26, 2012

(65) Prior Publication Data

US 2013/0346574 A1 Dec. 26, 2013

(51) Int. Cl.
*H04L 12/24* (2006.01)

(52) U.S. Cl.
CPC ........ *H04L 41/046* (2013.01); *H04L 41/0213* (2013.01); *H04L 41/0233* (2013.01)

(58) Field of Classification Search
CPC . H04L 12/2403; H04L 12/2405; H04L 41/02; H04L 41/046; H04L 41/0233; H04L 41/0213; H04L 12/2602; H04L 41/12; H04L 43/16; G07C 5/008; H04H 60/32
USPC ........................................................ 709/223
See application file for complete search history.

(56) References Cited

U.S. PATENT DOCUMENTS

| | | | |
|---|---|---|---|
| 5,802,309 A | 9/1998 | Cook et al. | |
| 5,828,830 A * | 10/1998 | Rangaraian et al. | ........... 714/48 |
| 5,864,865 A | 1/1999 | Lakis | |
| 5,913,037 A | 6/1999 | Spofford et al. | |
| 5,960,176 A | 9/1999 | Kuroki et al. | |
| 6,058,445 A | 5/2000 | Chari et al. | |
| 6,167,403 A * | 12/2000 | Whitmire et al. | ............ 709/223 |
| 6,176,883 B1 | 1/2001 | Holloway et al. | |

(Continued)

FOREIGN PATENT DOCUMENTS

| | | |
|---|---|---|
| CN | 101102226 A | 1/2008 |
| CN | 101192994 A | 6/2008 |

(Continued)

OTHER PUBLICATIONS

Extended European Search Report dated Sep. 18, 2013 in corresponding EP Application No. 13167221.4, 6 pgs.

(Continued)

*Primary Examiner* — Kevin T Bates
*Assistant Examiner* — Ronak Patel
(74) *Attorney, Agent, or Firm* — Shumaker & Sieffert, P.A.

(57) ABSTRACT

An example device includes an interface to receive, from a device management system, a request message that conforms to a network management protocol, a control unit that provides an execution environment for a management agent, and a data repository. The request message includes a set of managed object identifiers and a set of filter operator object identifiers. The management agent is operable to generate at least one filter criterion based on the managed object identifiers and the filter operator object identifiers, to retrieve managed object values stored in the data repository based on the managed object identifiers, each corresponding to a respective managed object identifier specified in the request message, to generate and output to the device management system a response based on the managed object identifiers of the request message and the retrieved managed object values that satisfy one or more of the at least one filter criterion.

18 Claims, 4 Drawing Sheets

(56) References Cited

U.S. PATENT DOCUMENTS

| | | | |
|---|---|---|---|
| 6,182,157 B1* | 1/2001 | Schlener | H04L 41/0213 |
| | | | 709/202 |
| 6,253,243 B1* | 6/2001 | Spencer | 709/224 |
| 6,351,773 B1 | 2/2002 | Fijolek et al. | |
| 6,363,421 B2* | 3/2002 | Barker et al. | 709/223 |
| 6,366,926 B1* | 4/2002 | Pohlmann et al. | |
| 6,574,662 B2 | 6/2003 | Sugiyama et al. | |
| 6,854,011 B2* | 2/2005 | Kim | 709/224 |
| 6,868,450 B1 | 3/2005 | Lucovsky | |
| 7,099,931 B2 | 8/2006 | Da Palma et al. | |
| 7,133,912 B1 | 11/2006 | Gary | |
| 7,143,153 B1 | 11/2006 | Black et al. | |
| 7,275,097 B2 | 9/2007 | Peake, Jr. et al. | |
| 7,310,664 B1 | 12/2007 | Merchant et al. | |
| 7,310,670 B1 | 12/2007 | Walbeck et al. | |
| 7,430,594 B2 | 9/2008 | Krupczak | |
| 7,496,685 B2 | 2/2009 | Chen et al. | |
| 7,593,999 B2* | 9/2009 | Nathanson | 709/217 |
| 7,600,147 B2 | 10/2009 | Agashe | |
| 7,653,709 B1 | 1/2010 | Miakinen | |
| 7,752,024 B2 | 7/2010 | Ball et al. | |
| 7,779,102 B2 | 8/2010 | Nogawa | |
| 8,037,205 B2* | 10/2011 | Chong et al. | 709/246 |
| 8,112,512 B2* | 2/2012 | Menditratta et al. | 709/224 |
| 8,156,246 B2 | 4/2012 | Short et al. | |
| 8,244,886 B2 | 8/2012 | Short et al. | |
| 8,266,269 B2 | 9/2012 | Short et al. | |
| 8,364,806 B2 | 1/2013 | Short et al. | |
| 8,370,477 B2 | 2/2013 | Short et al. | |
| 8,549,119 B1 | 10/2013 | Singh et al. | |
| 8,549,919 B2 | 10/2013 | Gunthner et al. | |
| 8,560,609 B2* | 10/2013 | Nathanson | 709/204 |
| 8,799,437 B1* | 8/2014 | Kumbhari | 709/223 |
| 2001/0052006 A1* | 12/2001 | Barker et al. | 709/223 |
| 2001/0052010 A1 | 12/2001 | Kim | |
| 2002/0042848 A1* | 4/2002 | Takats | 709/316 |
| 2002/0091815 A1 | 7/2002 | Anderson et al. | |
| 2002/0091824 A1 | 7/2002 | Anderson et al. | |
| 2002/0091944 A1 | 7/2002 | Anderson et al. | |
| 2002/0150050 A1* | 10/2002 | Nathanson | 370/241 |
| 2002/0188568 A1 | 12/2002 | Nickolaisen et al. | |
| 2003/0023605 A1 | 1/2003 | Sternin et al. | |
| 2003/0041134 A1 | 2/2003 | Sugiyama et al. | |
| 2003/0069963 A1 | 4/2003 | Jayant et al. | |
| 2003/0105861 A1 | 6/2003 | Lee | |
| 2003/0126195 A1 | 7/2003 | Reynolds et al. | |
| 2004/0006619 A1 | 1/2004 | Syed et al. | |
| 2004/0139193 A1 | 7/2004 | Refai et al. | |
| 2005/0015485 A1 | 1/2005 | Keefer et al. | |
| 2005/0039188 A1* | 2/2005 | Agashe | 719/310 |
| 2005/0198238 A1 | 9/2005 | Sim et al. | |
| 2005/0228885 A1 | 10/2005 | Winfield et al. | |
| 2006/0190553 A1 | 8/2006 | Kojima | |
| 2006/0235971 A1 | 10/2006 | McCloghrie et al. | |
| 2007/0156711 A1 | 7/2007 | Yuengling et al. | |
| 2007/0244614 A1* | 10/2007 | Nathanson | 701/35 |
| 2008/0043634 A1 | 2/2008 | Wang et al. | |
| 2008/0195745 A1 | 8/2008 | Bowra et al. | |
| 2008/0235374 A1 | 9/2008 | Ikeda | |
| 2009/0098892 A1 | 4/2009 | Trogolo et al. | |
| 2010/0023581 A1 | 1/2010 | Lahav | |
| 2010/0030423 A1* | 2/2010 | Nathanson | 701/35 |
| 2010/0260066 A1 | 10/2010 | August et al. | |
| 2011/0040781 A1 | 2/2011 | Faulkner et al. | |
| 2011/0081888 A1 | 4/2011 | Waniss | |
| 2011/0138291 A1 | 6/2011 | Twiddy et al. | |
| 2011/0231546 A1* | 9/2011 | Nathanson | 709/224 |
| 2011/0295989 A1 | 12/2011 | Kiyoto | |
| 2013/0346574 A1 | 12/2013 | Singaraju et al. | |

FOREIGN PATENT DOCUMENTS

| | | | | |
|---|---|---|---|---|
| CN | 102215132 A | | 10/2011 | |
| EP | 0831617 A2 | * | 3/1998 | H04L 41/0213 |
| EP | 0831617 B1 | * | 5/2006 | H04L 41/0213 |
| FR | 2816416 A1 | | 5/2002 | |

OTHER PUBLICATIONS

Case et al., "Protocol Operations for version 2 of the Simple Network Management Protocol (SNMPv2)," RFC 1448, Apr. 1993, 36 pp.

Guillebert "Advanced config questions about Event Translator and Varbind Filtering", available at http://opennms.530661.n2.nabble.com/Advanced-config-questions-about-Event-Translator-and-Varbind-Filtering-td5956145.html accessed Nov. 17, 2011, 9 pgs.

Harrington et al. "An Architecture for Describing Simple Network Management Protocol (SNMP) Management Frameworks" Network Working Group, the Internet Engineering Task Force draft, Dec. 2002, available at http://tools.ietf.org/html/rfc3411 (accessed Jun. 22, 2012), 65 pgs.

Jagadish et al,. "Network Management Traffic Optimization," Proc. of 14th National Conf. on Communications, NCC-2008, IIT Bombay, Feb 1-3, 2008, 5 pp.

McCloghrie et al., "Management Information Base for Network Management of TCP/IP-based internets: MIB-II," RFC 1213, Mar. 1991, 66 pp.

McCloghrie et al., "Structure of Management Information Version 2 (SMIv2)," RFC 2578, Network Working Group, Apr. 1999, 43 pp.

"OpenNMS" Event Configuration How-To—OpenNMS The OpenNMS Project, available at http://www.opennms.org/wiki/Event_Configuration_How-To, accessed Nov. 15, 2011, 17 pgs.

"[Patch] Allow varbind filtering based on varbind OID instead of varbind number" OpenNMS, available at http://issues.opennms.org/browse/NMS-4377, accessed Nov. 17, 2011, 2 pgs.

Presuhn et al., "Version 2 of the Protocol Operations for the Simple Network Management Protocol (SNMP)," RFC 3416, Network Working Group, Dec. 2002, 32 pp.

Schonwalder, "Extending SNMP to Support Bulk MIB Data Transfers," presented on behalf of the Network Management Research Group (NMRG), Jul. 2000, 9 pp., http://www.irtf.org/charters/management.html.

Schonwalder et al. "SNMP Traffic Analysis: Approaches, Tools, and First Results", Computer Science, Jacobs University, Bremen, Campus Ring 1, 28759 Bremen, Germany, IEEE 2007, 10 pgs.

Sprenkels et al., "Bulk Transfers of MIB Data," Communication Systems Division (SSC) CH-1015 Lausanne, Switzerland, Mar. 1999, 11 pp., http://infoscience.epfl.ch/record/198/files/TR99_009.pdf.

U.S. Appl. No. 12/688,635, by Uday Kishore Kumbhari, filed Jan. 15, 2010.

U.S. Appl. No. 12/755,269, by Vivek Singh, filed Apr. 6, 2010.

U.S. Appl. No. 12/970,509, by Vivek Singh, filed Dec. 16, 2010.

U.S. Appl. No. 13/183,198, by Vivek Singh, filed Jul. 14, 2011.

U.S. Appl. No. 13/411,248, by Vivek Singh, filed Mar. 2, 2012.

Godura et al., "Use of Control Variables to Convey Protocol Semantics in SNMP," Oct. 1995, IEEE, 11 pp.

Response filed Jun. 27, 2014 to the Extended European Search Report in corresponding EP Application No. 13167221.4 (15 pgs).

Third Office Action and Search Report, and translation thereof, from counterpart Chinese Application No. 20130251105.X, dated Nov. 5, 2018, 15 pp.

Translation of and original Office Action from counterpart Chinese Application No. 201310251105.X, dated Aug. 31, 2017, 21 pp.

Communication pursuant to Article 94(3) EPC from counterpart European Application No. 13167221.4 dated Jul. 28, 2017, 11 pp.

Response filed Nov. 28, 2017 to the Communication pursuant to Article 94(3) EPC from counterpart European Application No. 13167221.4 dated Jul. 28, 2017, 14 pp.

(56) References Cited

OTHER PUBLICATIONS

Translation of and original Office Action from counterpart Chinese Application No. 201310251105.X, dated Apr. 28, 2018, 6 pp.

* cited by examiner

FILTERING WITHIN DEVICE MANAGEMENT PROTOCOL QUERIES

TECHNICAL FIELD

This disclosure relates to computer networks and, more particularly, to techniques for configuring and managing network devices.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, various clients, such as human users, automated scripts or network management systems, can perform configuration tasks as well as collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may receive information either by polling the managed device or by receiving asynchronous events from the devices. In this way, the clients may allow a user to view current operating parameters, system logs, information related to network connectivity, network activity or other status information from the devices as well as view and react to event information received from the devices.

The Simple Network Management Protocol (SNMP) is a standard defined by the Internet Engineering Task Force (IETF) for managing network devices. SNMP uses a design that incorporates one or more management information bases (MIBs) within a managed device to describe and expose internal data elements of the managed device. Management devices, such as computer consoles and network management systems, store data to and read data from the SNMP MIBs of the devices to configure, monitor and generally control operation of the devices. For example, an SNMP agent executing on the managed device accesses the device's internal SNMP MIBS and exchanges network management information with an SNMP manager running on the network management system or other host. The SNMP agent responds to requests for information and directives from the SNMP manager.

Management devices may be configured to poll certain information, such as system load or system status information, from the managed network devices at configurable intervals. Conventionally, each time a management device requests the information, the management device generates a request for the information with an SNMP manager and sends the information to an SNMP agent of a managed network device. The SNMP agent decodes the request, identifies any potential duplicate requests, processes the request, generates a response, and sends the response to the SNMP manager. The SNMP manager then decodes the response and stores the information included in the response.

SUMMARY

In general, techniques are described that enable a management device to generate a request for information having parameters that specify certain filter criteria to be applied by a managed device to exclude information that would otherwise be included by the managed device in a response to the request. For example, techniques of this disclosure enable the management device to generate requests that include filter criteria and variable identifiers encoded in variable bindings of the request. The filter criteria may include various operators, values, and object identifiers. In one example implementation, two new types of object identifiers are defined. A first new type of object identifier is a filter operator object identifier, which is used to encode filter operators. A second new type of object identifier is a generic value object identifier, which is used to encode any numeric or string value. A managed device receives a request, including filter criteria encoded using the two new type of object identifiers, from the management device, parses the request to extract the variable bindings included in the request, retrieves information that is associated with the variable identifiers and satisfies the filter criteria, and returns the retrieved information to the management device.

In one embodiment, a method includes receiving, with a management agent executing on a network device and from a device management system, a request message, wherein the request message includes a set of managed object identifiers and a set of filter operator object identifiers, and generating at least one filter criterion based on the set of managed object identifiers and the set of filter operator object identifiers. The method also includes retrieving, with the management agent, a set of managed object values stored in a management information base (MIB) of the network device based on the set of managed object identifiers, wherein each managed object value of the set of managed object values corresponds to a respective managed object identifier of the set of managed object identifiers specified in the request message, generating, with the management agent, a response message based on the set of managed object identifiers specified in the request message and the retrieved set of managed object values, wherein each managed object value included in the response message satisfies the at least one filter criterion, and sending the response message to the device management system.

In another embodiment, a network device includes an interface to receive, from a device management system, a request message that conforms to a network management protocol, wherein the request includes a set of managed object identifiers and a set of filter operator object identifiers, a control unit that provides an execution environment for a management agent, and a data repository configured to store information. The management agent is operable to, in response to the request, generate at least one filter criterion based on the set of managed object identifiers and the set of filter operator object identifiers and to retrieve a set of managed object values stored in the data repository based on the set of managed object identifiers, wherein each managed object value of the set of managed object values corresponds to a respective managed object identifier of the set of managed object identifiers specified in the request message. The management agent is further operable to generate and output to the device management system a response message based on the set of managed object identifiers specified in the request message and the retrieved set of managed object values, wherein each managed object value included in the response message satisfies one or more of the at least one filter criterion.

In another embodiment, a computer-readable storage medium is encoded with instructions that cause one or more programmable processors of a network device to receive, from a device management system, a request message, wherein the request message includes a set of managed object identifiers and a set of filter operator object identifiers, and generate at least one filter criterion based on the set of managed object identifiers and the set of filter operator object identifiers. The instructions also cause the one or more programmable processors to receive a set of managed object values stored in a management information base (MIB) of the network device based on the set of managed object identifiers, wherein each managed object value of the set of managed object values corresponds to a respective managed object identifier of the set of managed object identifiers specified in the request message, generate a response message based on the set of managed object identifiers specified in the request message and the retrieved set of managed object values, wherein each managed object value included in the response message satisfies one or more of the at least one filter criterion, and send the response message to the device management system.

The techniques described herein may provide certain advantages. Rather than requesting all information for a particular managed object, techniques of the techniques may, for example, enable the device management system to reduce the number of requests sent to each managed device as each request may include a request for more specific information, thereby also reducing the number of requests received by the SNMP agent executing on the managed network device. Furthermore, by reducing the amount of information that is retrieved from a data store of the managed network device, the retrieval of the information from the data store may be more efficient. In such instances, the request and response sockets of the managed network device may be less likely to overflow and the amount of network traffic resulting from the request and response messages may be reduced.

The details of one or more embodiments are set forth in the accompanying drawings and the description below. Other features, objects, and advantages will be apparent from the description and drawings, and from the claims.

DETAILED DESCRIPTION

Figure 1:
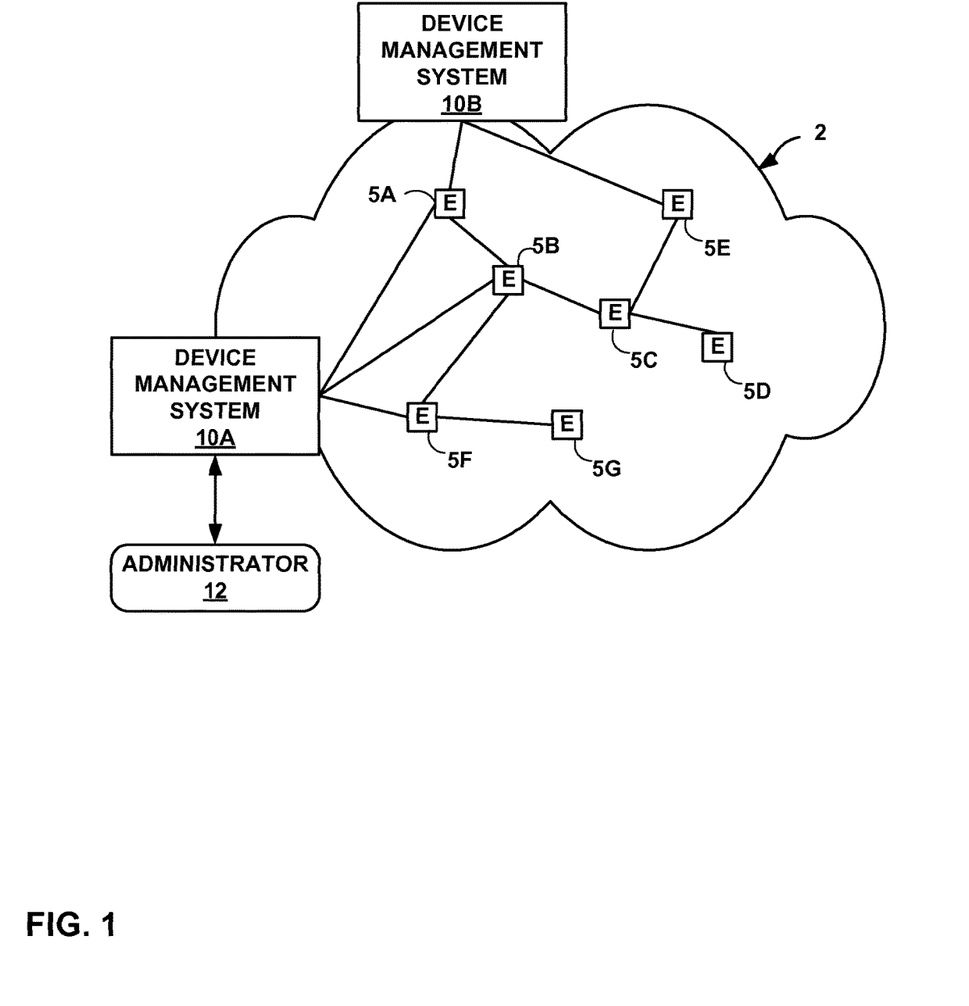
FIG. 1 is a block diagram illustrating elements of an example network that provide management data to device management systems in accordance with one or more aspects of this disclosure.

FIG. 1 is a block diagram illustrating elements of an example network 2 that provide management data to device management systems 10A and 10B in accordance with one or more aspects of this disclosure. Even though two device management systems 10A and 10B (collectively, "device management systems 10") are illustrated in FIG. 1, any number of device management systems 10 may be used to manage elements of enterprise network 2. Managed devices 5A-5G (collectively, "managed devices 5") of enterprise network 2 include network devices interconnected via communication links to form a communication topology in order to exchange resources and information. Even though seven managed devices 5 are illustrated in FIG. 1, any number of managed devices 5 may be included in enterprise network 2. Managed devices 5 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. Enterprise network 2 supports the exchange of protocol data units (PDUs) for transmitting data among managed devices 5 and device management systems 10. Such PDUs may comprise, for example, Internet Protocol (IP) packets Ethernet datagrams, and Asynchronous Transfer Mode (ATM) cells. Communication links interconnecting managed devices 5 may be physical links (e.g., optical, copper, and the like) or wireless.

Enterprise network 2 may represent an enterprise network, a campus network, a service provider network, or other autonomous system for example. Thus, while described with respect to an enterprise network, the techniques of this disclosure are applicable to other network types, public and private, including local area networks (LANs), virtual local area networks (VLANs), virtual private networks (VPNs), and the like. Enterprise network 2 may be coupled to one or more additional private or public networks, e.g., the Internet (not shown).

Device management systems 10 are communicatively coupled to managed devices 5 via enterprise network 2. Device management systems 10 may be coupled either directly or indirectly to the various managed devices 5. Once managed devices 5 are deployed and activated, administrator 12 may use device management systems 10 to manage the managed devices 5 using a management protocol designed for management of configuration data within managed devices 5, such as the Simple Network Management Protocol (SNMP), or the Network Configuration (NETCONF) protocol, or a derivative thereof, such as the Juniper Device Management Interface, to perform the configuration.

In common practice, device management systems 10 and managed devices 5 managed by device management systems 10 are centrally maintained by an IT group of the enterprise and are collectively referred to as an element management system (EMS) or a network management system (NMS). Administrator 12 interacts with one or more of device management systems 10 to remotely monitor and configure managed devices 5. For example, administrator 12 may receive alerts from device management system 10A regarding any of managed devices 5, view configuration data of managed devices 5, modify the respective configuration data of managed devices 5, add new network devices to network 2, remove existing network devices from network 2, or otherwise manipulate the network 2 and network devices therein.

Administrator 12 uses device management systems 10 to configure managed devices 5 to specify certain operational characteristics that further the objectives of administrator 12. For example, administrator 12 may specify for a managed device 5 a particular operational policy regarding security, device accessibility, traffic engineering, quality of service (QoS), network address translation (NAT), packet filtering, packet forwarding, rate limiting, or other policies. Device management systems 10 use a network management protocol, such as SNMP, designed for management of configuration data within network devices or monitoring and retrieving operation data from managed devices 5. SNMP allows device management systems 10 to traverse and modify management information bases (MIBs) within each of devices 5 that describe the structure of the management data of the device by using a namespace that contains object identifiers (OIDs). Each OID represents, within the particular managed device 5, a managed object that identifies a specific characteristic about the managed device. Managed objects include one or more object instances, also represented by an OID in a MIB, that each identifies a variable of management data (e.g., a operational/configuration parameter) within the network device that can be read or set by the client via SNMP. Further details regarding SNMP can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which is incorporated herein by reference.

Device management systems 10 may issue commands in accordance with the network management protocol to monitor or control managed network devices 5 (e.g., SNMP GetRequest, GetNextRequest, or SetRequest commands). In an example operation, device management system 10A issues a command to direct an SNMP agent executing on one of devices 5 (e.g., device 5A) to retrieve a set of management information. The management information may include configuration and/or operational information. The command includes a request identifier that uniquely identifies that particular request associated with the command. Device 5A receives the request for the set of management information in the form of variable bindings ("varbinds"). The varbinds include a set of name-value pairs of management objects, where the name is the object identifier (OID). The SNMP agent executing on device 5A retrieves values for the set of requested OIDs and returns the OIDs and values in one or more response packet data units (PDUs). That is, the SNMP agent uses the OIDs to select object instances within the MIB, where each of the object instances is bound to a variable (e.g., a configurable parameter or status data unit) within the internal data space of the control software executing on the network device. In this way, the SNMP agent utilizes the structures in the MIB to allow device management system 10A to read or set any of the specific data elements of the internal data space that are described by the MIB and thereby exposed to the SNMP agent by way of the MIB.

In an example operation of a command and message exchange, a device management system 10, e.g., device management system 10A, issues a command to direct an SNMP agent executing on one of managed devices 5, e.g., device 5A, to retrieve a set of management information. The management information may include configuration and/or operational information. The command includes a request identifier that uniquely identifies that particular request associated with the command. Managed device 5A receives the request for the set of management information in the form of variable bindings ("varbinds"). The varbinds include a set of name-value pairs of management objects, where the name is the OID. The SNMP agent executing on managed device 5A retrieves values for the set of requested OIDs and returns the OIDs and values in one or more response PDUs. That is, the SNMP agent uses the OIDs to select object instances within the MIB, where each of the object instances is bound to a variable (e.g., a configurable parameter or status data unit) within the internal data space of the control software executing on the network device. In this way, the SNMP agent uses the structures in the MIB to allow device management systems 10 to read or set any of the specific data elements of the internal data space that are described by the MIB and thereby exposed to the SNMP agent by way of the MIB.

In accordance with techniques of this disclosure, one of device management systems 10 (e.g., device management system 10A) generates a request message that includes one or more requested OIDs (i.e., managed objects) and one or more filter criteria and sends the request message to a managed device (e.g., managed device 5A). In general, the request message includes varbinds having a name-value pair, where the name is the name of the OID and the value is set to null.

In some examples, an administrator (e.g., administrator 12) may configure device management system 10A with the filter criteria included in the request message. The filter criteria include filter operators and filter values. In one example implementation, two new types of object identifiers are defined. A first new type of object identifier is a filter operator object identifier, which is used to encode filter operators. A second new type of object identifier is a generic value object identifier (genValOID), which is used to encode any value within the name portion of varbind. In some examples, the generic value object identifier may have an octet string that contains an encoded string or integer value. Using the two new types of object identifiers, techniques of this disclosure enable filter operators and values to be encoded within varbinds along with operational OIDs to create a filter.

Managed device 5A receives the request message and retrieves managed object values from the MIB based on the request message. More specifically, the management agent executing on managed device 5A retrieves the managed object value from the MIB. Each managed object value corresponds to one of the OIDs included in the request message. In examples where the request message does not include filter parameters, managed device 5A retrieves the managed object values stored in the MIB for each OID specified in the request message. In examples where the request message includes filter criteria, managed device 5A applies the filter criteria to exclude or otherwise filter managed object values stored in the MIB for each OID specified in the request message. That is, the filter criteria included in the request message are applied by managed device 5A such that only managed object values that satisfy the filter criteria are retrieved from the MIB.

After retrieving the appropriate managed object values from the MIB, the management agent executing on managed device 5A generates a response message that includes the managed object identifiers specified in the request message and the managed object values retrieved from the MIB for each OID. In some embodiments, the response message also includes the filter criteria originally included in the request message. Managed device 5A sends the response message to the device management system that originally sent the request message (e.g., device management system 10A).

In this manner, rather than requesting all information for a particular managed object, device management systems 10 may generate requests for more a more limited or targeted set of information that, in turn, may reduce the number of requests sent to each managed device and reduce the number of requests received and responses generated by the SNMP agent executing on the managed network device. Furthermore, by reducing the amount of information that is retrieved from MIBs of managed devices 5, the retrieval of the information from the data store may be more efficient. In such instances, the request and response sockets of managed devices 5 may be less likely to overflow and the amount of network traffic resulting from the request and response messages exchanged between device management systems 10 and managed devices 5 may be reduced.

Figure 2:
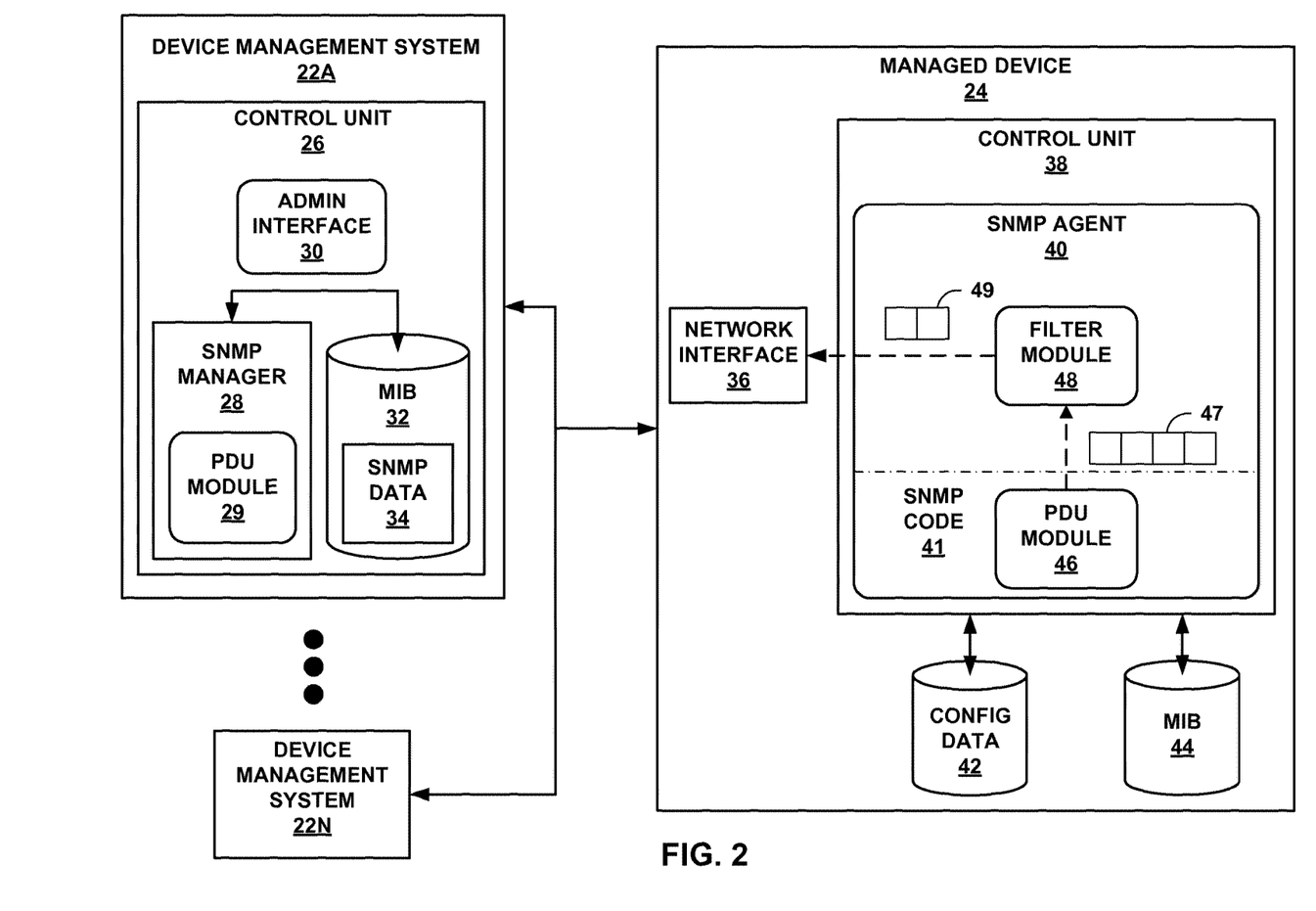
FIG. 2 is a block diagram illustrating an example set of network management devices that configure an example managed device to periodically provide specified management information in accordance with one or more aspects of this disclosure.

FIG. 2 is a block diagram illustrating example embodiments of device management systems 22A-22N that configure managed device 24 (hereinafter, "managed device 24" or "device 24") to periodically provide specified management information in accordance with one or more aspects of this disclosure. Device management systems 22A-22N (collectively, "device management systems 22") manage managed device 24 using a management protocol, such as SNMP, for exchanging management protocol messages over a communication link. While described with respect to one particular protocol for managing network devices, e.g., SNMP, techniques of this disclosure may apply to any network management protocol by which a management application requests management information from a managed device and by which the managed device respond to the management information request by providing the management application with the requested management information.

Each of device management systems 22A-22N (collectively, "device management systems 22") may be an example of device management systems 10 of FIG. 1 and managed device 24 may be an example of a managed device 5 of FIG. 1. In the example embodiment illustrated in FIG. 2, device management system 22A includes control unit 26 and managed device 24 includes network interface 36 and control unit 38.

Each of control units 26 and 38 may include one or more processors that execute software instructions, such as those used to define a software or computer program, stored to a computer-readable storage medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 38 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 26 provides an operating environment for SNMP manager 28, administrative interface (ADMIN INTERFACE) 30 and management information base (MIB) 32. MIB 32 is a hierarchy of information that specifies managed objects in device 24 managed by SNMP manager 28. MIB 32 includes managed object instances that each represent an aspect of SNMP managed data (SNMP DATA) 34, which may include, for example, configuration or descriptive data for device 24. SNMP manager 28 represents an exemplary instance of an SNMP management application or, more generally, a network management application. SNMP manager 28 is one example of a network management module. In one example, SNMP manager 28 monitors and controls one or more of managed devices 5 of FIG. 1.

As shown in FIG. 2, SNMP manager 28 includes PDU module 29. PDU module 29 generates request messages for sending to device 24 and process response messages received from device 24. In generating request messages, PDU module 29 generates SNMP request PDUs that include varbinds having managed object identifier (OID) and managed object value pairs. Each OID and value pair included in the SNMP request PDU may encode a respective filter operator or filter value that may be used as filter criteria applied by SNMP agent 40 to filter information retrieved from MIB 44. As described herein, the request message may include one or more filter operators (e.g., encoded within filter operator OIDs) and filter values (e.g., encoded within generic value OIDs) as well as one or more managed object identifier and managed object value pairs encoded within the varbinds.

Example filter operators include equality operators, mathematic and bit-wise operators, and logic operators. Example filter values include any string or numeric value. In one example, the filter values are encoded in the name portion of the varbinds using basic encoding rules (BER) encoding as defined in the ASN.1 standard. Additional details of the request message are described below with respect to FIG. 3. In general, PDU module 29 generates SNMP request PDUs based on configuration information stored in MIB 32 or other data repository of device management system 22A, based on configuration information entered by a network operator using administrator interface 30, or based on a combination of both configuration information received from an administrator and configuration information stored by device management system 22A.

Device 24 may be any device having one or more processors and a memory, and that is capable of executing one or more software processes, including SNMP agent 40, that operates in accordance with a network management protocol, such as SNMP. Device 24 stores objects that represent device 24 resources in a structured form within MIB 44. Each object is identifiable by a unique object identifier. The specific characteristics, or "managed objects," of device 24 typically include resources, parameters, settings, or descriptors for a component, software objects' attributes, system attributes, or global data, for instance. Examples of managed objects include network interfaces of device 24, data describing the relationships between multiple sub-layers of network interfaces, and data describing and providing status information for IEEE 802.3 Medium Attachment Units (MAUs). MIB 44 may store objects in the form of one or more tables, databases, linked lists, radix trees, or other suitable data structure.

A network operator or other administrator interacts with administrative interface 30 to direct SNMP manager 28 to manage device 24 in a specified manner, e.g., to modify the configuration of device 24 or to monitor the status or performance of device 24, by requesting variable information available from device 24 according to MIB 32. For example, the operator may enter commands to view and modify SNMP data 34 and ultimately to deploy the configuration data to MIB 44 of device 24 as operational configuration data of the device. As another example, the operator may enter commands to retrieve the operational data from MIB 44 of device 24. In another example, SNMP manager 28 may be configured to automatically check the configuration or the status of device 24 or monitor the performance of device 24 at specified times, e.g. once every two minutes or once per month. The status of device 24 may include one of up, down, or warning. When checking the performance of device 24, SNMP manager 28 may retrieve information about network latency, traffic load, errors, central processing unit load, memory usage, and the like. The current configuration of SMNP manager 28 may be contained in SNMP data 34. MIB 32 and SNMP data 34 may each be stored in the form of one or more tables, databases, linked lists, radix trees, or other suitable data structure.

Control unit 38 of device 24 provides an operating environment for SNMP agent 40, configuration data (CONFIG DATA) 42, and MIB 44. Device 24 stores management data in a structured form, such as MIB 44. MIB 44 may store management data in the form of one or more tables, databases, linked lists, radix trees, or other suitable data structure. In some examples, configuration data 42 may be included within MIB 44 and may include tables or other data structures that conform to the structure of MIB 44, thereby minimizing the changes required to implement the techniques of this disclosure and increasing the ease with which the techniques of this disclosure may be deployed. SNMP agent 40 may operate as a software daemon executing within control unit 38. More specifically, SNMP agent 40, as shown in FIG. 2, includes long-standing SNMP program code 41 and filter module 48. Long-standing program SNMP code 41 includes PDU module 46, which is configured to generate response message 47 in response to receiving the request message from device management system 22A.

In some examples, SNMP agent 40 includes a set of sockets for receiving SNMP requests, another set of sockets for sending SNMP responses and another set of sockets for sending SNMP traps. When SNMP agent 40 receives an excessive number of SNMP requests, the set of sockets configured to receive the SNMP requests may overflow. Similarly, if SNMP agent 40 sends an excessive number of responses, the set of sockets configured to send the responses may overflow. Techniques of this disclosure may reduce the number of SNMP responses sent by SNMP agent 40, which may make it less likely that the sockets will overflow.

SNMP agent 40 receives the request message from device management system 22A (e.g., via network interface 36). SNMP agent 40 parses the request message to identify the SNMP command specified in the request message (e.g., Get, GetNext, GetBulk, Set, etc.), extract the varbinds and identify the requested information (e.g., the requested managed objects). In the example embodiment shown in FIG. 2, filter module 48 identifies the operational OIDs included in the varbinds and identifies the filter operator and filter value OIDs included in the varbinds. The filter criteria applied by SNMP agent 40 are comprised of a combination of the filter operators and the filter values specified by the OIDs. In some examples, the filter criteria are generated by filter module 48 may be generated as a pre-order construct based on the order of the filter operators, filter values, and managed objects encoded within the varbinds of the request message. As described herein, the filter operators may be encoded as a new type of object identifier (e.g., a filter operator OID) having the same format as standard managed object identifiers. Similarly, the filter values may be encoded as a new type of object identifier (e.g., a general value OID) having the same format as standard managed object identifiers. That is, the filter operators and filter values may each be encoded within SNMP messages as if the filter operators and values are standard configuration data. In this manner, techniques of this disclosure may make use of the existing SNMP protocol without requiring modification.

Filter module 48 may pass the SNMP command information and the operational OIDs included in the SNMP request PDU to PDU module 46. In this example embodiment, PDU module 46 generates queries that request information for the operational OIDs, but does not include the filter criteria, such that MIB 44 returns all of the information about the operational OIDs. PDU module 46 receives the request OID values from MIB 44 and generates SNMP response PDU 47 that includes the operational OIDs specified in the SNMP request PDU as well as the retrieved values for each of the operational OIDs. Filter module 48 receives SNMP response PDU 47 from PDU module 46 and applies the filter criteria specified in the SNMP request message to exclude one or more of the retrieved values. That is, filter module 48 excludes values that do not satisfy the filter criteria. Using the remaining values, filter module 48 generates SNMP response PDU 49 and SNMP agent 40 sends SNMP response PDU 49 to device management system 22A. In some examples, the SNMP response PDU includes varbinds for the filter criteria as well as varbinds for the OID and value pairs. By implementing filter module 48 outside of long-standing SNMP program code 41, the techniques of this disclosure may be more easily implemented in conjunction with the existing SNMP standards and take advantage of the stability and familiarity of long-standing SNMP program code 41.

In another embodiment, SNMP agent 40 may process the SNMP request PDU and filter criteria by applying the filter criteria as part of the query execution. As one example, PDU module 46 parses the varbinds included in the SNMP request PDU and generates queries to execute the command specified in the SNMP request PDU. The queries may correspond to a Get, Get-Next, Get-Bulk, or Set command, as specified in the SNMP request PDU. When PDU module 46 receives the data structure for the table associated with the operational OID, PDU module 46 applies the filter criteria to confirm that, if the command is applied to the column, the result satisfies the filter criteria and, therefore, would produce a valid result. In examples where application of the command produces a valid result, the values for the requested operational OIDs are received from MIB 44 and PDU module 46 generates an SNMP response PDU for sending to device management system 22A. The SNMP response PDU may include varbinds for the filter criteria as well as varbinds for the OID and value pairs. If none of the OIDs satisfy the filter criteria, the SNMP response PDU includes the varbinds specified in the SNMP request PDU with no changes.

Figure 3:
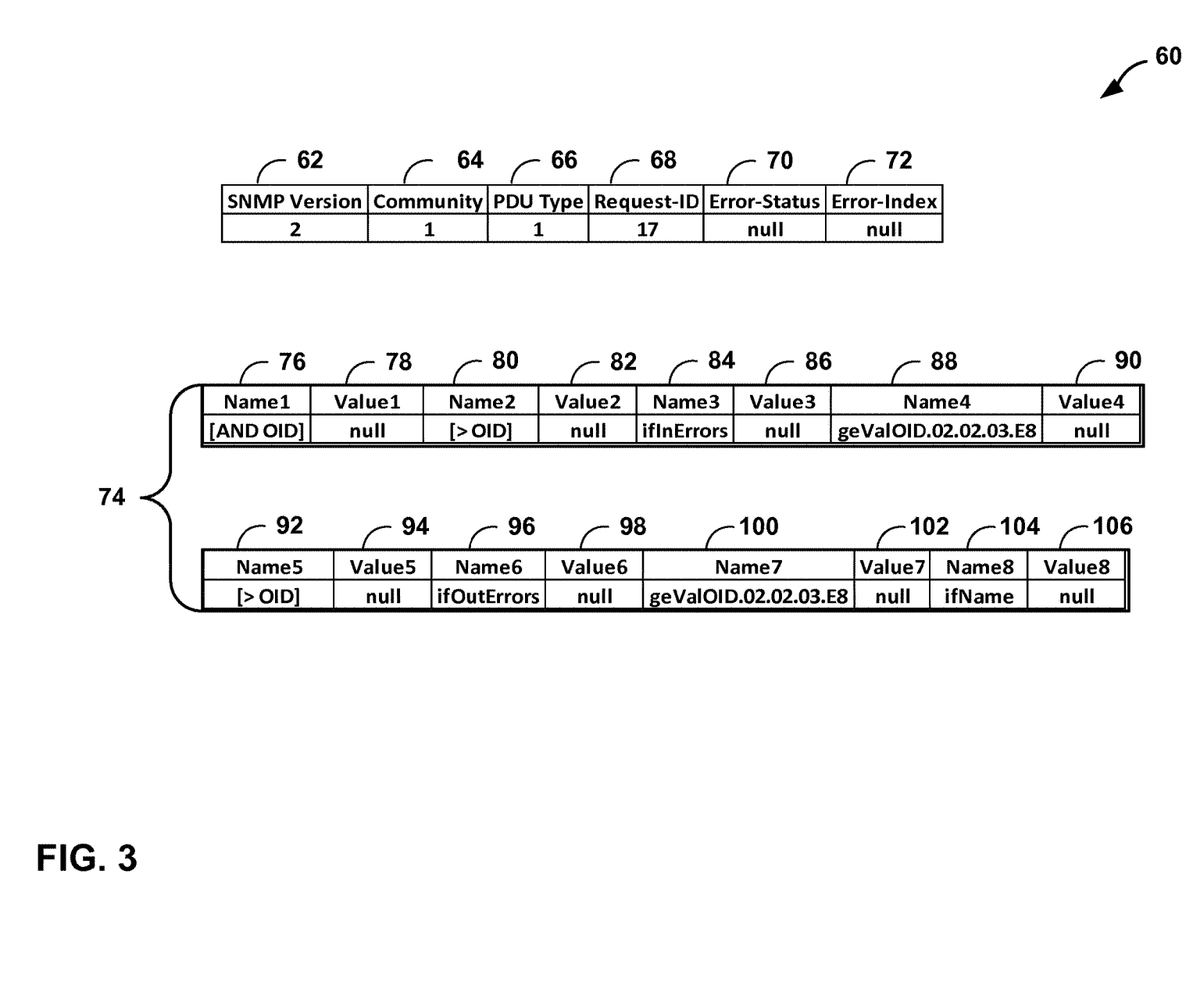
FIG. 3 is an example request that may be generated by a management device operating in accordance with one or more aspects of this disclosure

FIG. 3 is an example request PDU that may be generated by a management device operating in accordance with one or more aspects of this disclosure. While the example request PDU in FIG. 3 is described with respect to SNMPv2, the same techniques may be used by other management protocols or other versions of the SNMP protocol.

Request PDU 60 includes SNMP version number 62, community name 64, PDU type 66, request identifier 68, error status 70, error index 72, and variable bindings 74. SNMP version number 62 specifies the version of SNMP that is being used to generate request PDU 60. Community name 64 defines an access environment for a group of network management devices, e.g., device management system 22A. PDU type 66 identifies the type of PDU transmitted. For example, if PDU type 66 is set to one, the PDU is identified as a get-next-request PDU, whereas if PDU type 66 is set to two, the PDU is identified as a get-response PDU. In general, a get-response PDU returns the values of one or more variables and is generated in response to a get-request or get-next-request PDU. Request identifier 68 specifies a value that uniquely identifies the request PDU and the corresponding response PDU. In general, the request identifier of a get-response PDU is set to the same value as the request ID of the corresponding request. Error status 70 is an integer set by SNMP agent 40, for example, to identify an error condition. Error status 70 having a value of zero identifies that there is no error while error status 70 having a value of six identifies a "noAccess" error. A "noAccess" error signals that access was denied to the object for security reasons. Error index 72 specifies which variable was in error when the error occurred.

Each variable binding of variable bindings 74 includes a variable name, e.g., OID, and a value associated with the variable name. As shown in FIG. 3, the variable names and values included in variable bindings 74 include operational OIDs, filter operation OIDs, and a generic value OID. In particular, variable bindings 74 specify two operational OIDs, an equality operator filter criterion, a logical operator filter criterion, and a filter value filter criterion. Request PDU 60 corresponds to a get-request PDU that requests names for interfaces in which the number of input errors and the number of output errors are both greater than 1000. Name 76 is set to a value that corresponds to an OID for a logical AND operation filter criterion. Name 80 is set to a value that corresponds to an OID for a greater than logical operation filter criterion. Name 84 is set to a value that corresponds to the if InErrors OID. Name 88 is set to the basic encoding rules (BER) encoding of the integer 1000. Name 92 is set to a value to an OID for a greater than logical operation filter criterion. Name 96 is set to a value that corresponds to the if OutErrors OID. Name 100 is set to the basic encoding rules (BER) encoding of the integer 1000. Name 104 is set to a value corresponds to the ifName OID. Values 78, 82, 86, 90, 94, 98, 102, and 106 are set to a null value as request PDU 60 is a request message and, in accordance with the SNMP protocol, the values are retrieved from a MIB by the SNMP agent that receives request PDU 60 (e.g., retrieved from MIB 44 by SNMP agent 40 of device 24 shown in FIG. 2). As shown in example request PDU 60, the filter criteria are specified in a pre-order encoding. In other examples, other types of encoding and other orders may be used to encode the filter criteria.

When SNMP agent 40 of device 24 (shown in FIG. 2) receives request PDU 60, filter module 48, in various instances, processes variable bindings 74 to identify the filter criteria represented by the generic value and filter operator OIDs as well as the operational OIDs included in variable bindings 74. For example, filter module 48 may process the variable name and value pairs included in variable bindings 74 in order (e.g., from left to right as shown in FIG. 3). Filter module 48 identifies the value stored in name 76 as corresponding to a logical AND operator. Filter module 48 is configured such that a logical AND operator requires two parameters, one for each side of the logical AND operator. Thus, filter module 48 processes the next variable name and value pair (i.e., name 80 and value 82). However, because the value stored in name 80 corresponds to a greater than operator, filter module 48 is configured to treat the greater than operator as a nested operator and is configured such that the greater than operator requires two parameters.

Filter module 48 processes the third variable name and value pair (i.e., name 84 and value 86). The value stored in name 84 corresponds to the if InErrors OID (e.g., an operational OID). Filter module 48 is configured such that operational OIDs are acceptable parameters for filter criterion and sets the value of the first parameter required for the greater than operator to the ifinErrors OID. Filter module 48 processes the next variable name and value pair (i.e., name 88 and value 90) and identifies the value stored in name 88 as being the BER encoding of the integer 1000. The integer 1000 is used as the value for the second parameter of the greater than equality operator.

Filter module 48 processes the next variable name and value pair (i.e., name 92 and value 94) and identifies the value stored in name 92 as a greater than equality operator that requires two parameters. The result of the greater than operation is treated as the second parameter of the logical AND operator specified in name 76. The value stored in name 96 corresponds to the if OutErrors OID (e.g., an operational OID). Filter module 48 is configured such that operational OIDs are acceptable parameters for filter criterion and sets the value of the first parameter required for the greater than operation to the if OutErrors OID. Filter module 48 processes the next variable name and value pair (i.e., name 100 and value 102) and identifies the value stored in name 100 as being the BER encoding of the integer 1000. The integer 1000 is configured by filter module 48 as the second parameter for the greater than equality operator specified in name 92. Based on the first seven variable name and value pairs included in variable bindings 74, filter module 48 is configured with a filter criterion that is valid when both the value associated with the ifInError OID is greater than 1000 and the value associated with the if OutError OID is greater than 1000. Filter module 48 processes the eight variable name and value pair included in variable bindings 74 (i.e., name 96 and value 98) and determines that the value stored in name 96 corresponds to the ifName OID. After processing all of variable bindings 74 shown in FIG. 3, filter module 48 generates a filter criterion that, when used to retrieve information from MIB 44, returns the values associated with the ifName OID when the number of ifInErrors and if OutErrors are both greater than 1000. That is, queries generated based on request PDU 60 and executed against MIB 44 by SNMP agent 40 return the names of the interfaces having more than 1000 input errors and more than 1000 output errors.

Figure 4:
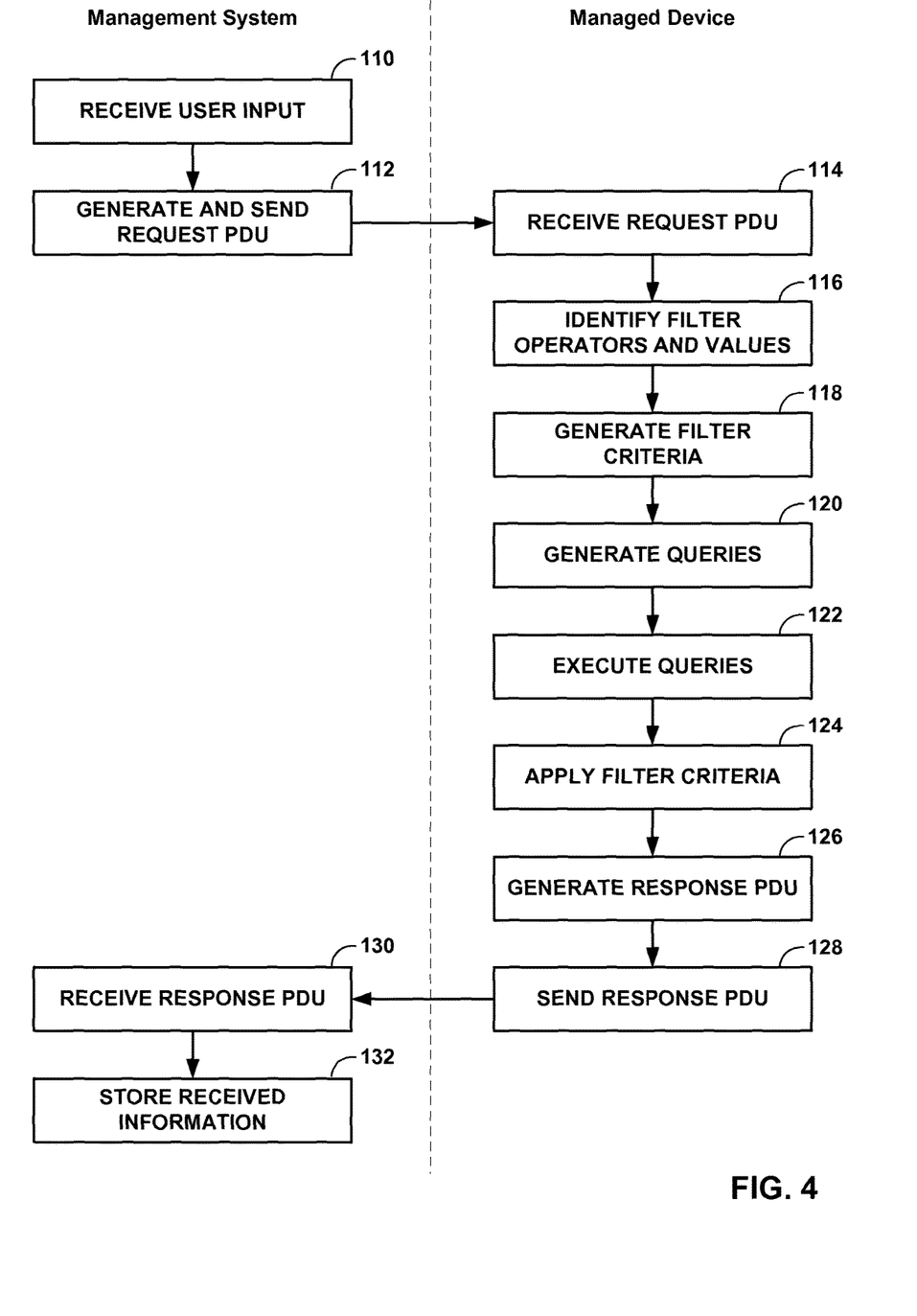
FIG. 4 is a flowchart illustrating an example process for using filtering in SNMP queries in accordance with one or more aspects of this disclosure.

FIG. 4 is a flowchart illustrating an example process for using filtering in SNMP queries in accordance with one or more aspects of this disclosure. For purposes of clarity, the method shown in FIG. 4 will be described with respect to device management system 22A and device 24 shown in FIG. 2.

Device management system 22A receives configuration information, e.g., from a network operator (110). The configuration information may include filter criteria, a query, configuration commands, or other information that device management system 22A may use to generate an SNMP request PDU. In generating the SNMP request PDU (112), device management system 22A may include at least a portion of the received configuration information. For example, device management system 22A may encode filter criteria specified in the received configuration information into the SNMP request PDU. As described herein, the SNMP request PDU includes varbinds that encode filter operator OIDs, generic value OIDs, and operational OIDs. The filter operator OIDs and the generic value OIDs are new types of OIDs defined in accordance with techniques of this disclosure that enable device management system 22A to include filter criteria in SNMP request PDUs as if SNMP agent 40 and MIB 44 operated as a database management system. Device management system 22A sends the generated request PDU to a managed device (e.g., managed device 24) (112).

SNMP agent 40 of device 24 receives the SNMP request PDU from device management system 22A, e.g., via network interface 36 and a request socket of SNMP agent 40 (114). SNMP agent 40 processes the request message to identify the SNMP command specified in the request message (e.g., Get, GetNext, GetBulk, Set, etc.), extract the varbinds, identify the requested information (e.g., the requested managed objects), identify the filter operators, and identify the filter values (116). Using the managed object identifiers, the filter operator object identifiers, and filter value object identifiers included in the SMNP request message, SNMP agent 40 generates at least one filter criterion (118). PDU module 46 generates queries to retrieve information from MIB 44 based at least in part on the SNMP command specified in the SNMP request PDU as well as the identified managed objects (120). In one example embodiment, PDU module 46 generates queries that request information for the operational OIDs, but does not include the filter criteria, such that MIB 44 returns all of the information about the operational OIDs. In another example embodiment, PDU module 46 generates queries that include the filter criteria defined by the filter operators, filter values, and managed objects encoded in the variable bindings of the SNMP request PDU.

In examples where the queries do not include the filter criteria, PDU module 46 executes the queries (122), receives the request OID values from MIB 44, and generates an initial response PDU 47 that includes all of the values retrieved from PDU module 46. Initial response PDU 47 is passed to filter module 48, which applies the filter criteria specified in the SNMP request message to exclude one or more of the retrieved values (124). That is, filter module 48 excludes values that do not satisfy the filter criteria. Using the remaining values, filter module 48 generates SNMP response PDU 49 (126) and SNMP agent 40 sends SNMP response PDU 49 to device management system 22A (128). In some examples, the SNMP response PDU includes varbinds for the filter criteria as well as varbinds for the OID and value pairs. By implementing filter module 48 outside of long-standing program code 41, the techniques of this disclosure may be more easily implemented in conjunction with the existing SNMP standards and take advantage of the stability and familiarity of long-standing program code 41.

In examples where the queries generated by PDU module 46 include the filter criteria, PDU module 46 executes the queries (122) and MIB 44 applies to filter criteria to exclude values that do not satisfy the filter criteria (124). PDU module 46 generates the SNMP response PDU (126) and SNMP agent 40 sends the response PDU to device management system 22A (128).

Device management system 22A receives the response PDU from device 24 (130) and PDU module 29 of SNMP manager 28 processes the response PDU to extract the information encoded within the response PDU. In some examples, SNMP manager 28 stores operational information and/or configuration information included in the response PDU within a data repository of device management system 22A (e.g., MIB 32) (132).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments of the have been described. These and other embodiments are within the scope of the following claims.

What is claimed is:

1. A method comprising:
receiving, with a management agent executing on a network device and from a device management system, a request message, wherein the request message includes a set of managed object identifiers and a set of filter operator object identifiers, wherein the management agent operates in accordance with a simple network management protocol (SNMP), wherein the request message comprises one of an SNMP GET, GETNEXT, or GETBULK command, and wherein each of the set of filter operator object identifiers specifies one of a mathematical operator, an equality operator, a bitwise operator, and a logical operator;
generating at least one filter criterion based on the set of managed object identifiers and the set of filter operator object identifiers;
retrieving, with the management agent, a set of managed object values stored in a management information base (MIB) of the network device based on the set of managed object identifiers, wherein each managed object value of the set of managed object values corresponds to a respective managed object identifier of the set of managed object identifiers specified in the request message;

generating, with the management agent, a response message based on the set of managed object identifiers specified in the request message and the retrieved set of managed object values, wherein each managed object value included in the response message satisfies the at least one filter criterion; and sending the response message to the device management system.

2. The method of claim 1, wherein each respective filter operator object identifier of the set of filter operator object identifiers is encoded within a variable binding of the request message as if the respective filter operator object identifier is standard configuration data.

3. The method of claim 1,
wherein each managed object identifier of the set of managed object identifiers and each filter operator object identifier of the set of filter operator object identifiers are included in the request message in an order, and
wherein generating the at least one filter criterion comprises:
identifying, with the management agent, a respective filter operator associated with each filter operator of the set of filter operator identifiers specified in the request message; and
combining the respective filter operators and the managed object identifiers into the at least one filter criterion based on the order.

4. The method of claim 1,
wherein the request message further includes a set of generic value object identifiers,
wherein each managed object identifier of the set of managed object identifiers, each filter operator object identifier of the set of filter operator object identifiers, and each generic value object identifier of the set of generic value object identifiers are included in the request message in an order, and
wherein generating the at least one filter criterion comprises:
identifying, with the management agent, a respective filter value associated with each generic value object identifier of the set of generic value object identifiers specified in the request message;
identifying, with the management agent, a respective filter operator associated with each filter operator of the set of filter operator identifiers specified in the request message; and
combining the respective filter operators, the respective filter values, and the managed object identifiers into the at least one filter criterion based on the order.

5. The method of claim 1, further comprising:
filtering, with the management agent, the set of managed object values retrieved from the MIB by at least applying the at least one filter criterion to each managed object value of the set of managed object values.

6. The method of claim 1, wherein retrieving the set of managed object values comprises retrieving managed object values from the MIB, wherein each of the managed object values satisfy one or more of the at least one filter criterion.

7. The method of claim 1, wherein the request message further includes a set of generic value object identifiers, wherein the each generic value object identifier of the set of generic value object identifiers comprise a value encoded in accordance with basic encoding rules (BER) encoding.

8. A network device comprising:
an interface to receive, from a device management system, a request message that conforms to a network management protocol, wherein the request includes a set of managed object identifiers and a set of filter operator object identifiers, wherein the request message comprises one of a simple network management protocol (SNMP) GET, GETNEXT, or GETBULK command, and wherein each of the set of filter operator object identifiers specifies one of a mathematical operator, an equality operator, a bitwise operator, and a logical operator;
a control unit that provides an execution environment for a management agent that operates in accordance with SNMP; and
a data repository configured to store information,
wherein, in response to the request, the management agent is operable to generate at least one filter criterion based on the set of managed object identifiers and the set of filter operator object identifiers and to retrieve a set of managed object values stored in the data repository based on the set of managed object identifiers,
wherein each managed object value of the set of managed object values corresponds to a respective managed object identifier of the set of managed object identifiers specified in the request message, and
wherein the management agent is operable to generate and output to the device management system a response message based on the set of managed object identifiers specified in the request message and the retrieved set of managed object values, wherein each managed object value included in the response message satisfies one or more of the at least one filter criterion.

9. The network device of claim 8, wherein each respective filter operator object identifier of the set of filter operator object identifiers is encoded within a variable binding of the request message as if the respective filter operator object identifier is standard configuration data.

10. The network device of claim 8,
wherein each managed object identifier of the set of managed object identifiers and each filter operator object identifier of the set of filter operator object identifiers are included in the request message in an order, and
wherein the management agent is operable to identify a respective filter operator associated with each filter operator of the set of filter operator identifiers specified in the request message, and to combine the respective filter operators and the managed object identifiers into the at least one filter criterion based on the order.

11. The network device of claim 8,
wherein the request message further includes a set of generic value object identifiers,
wherein each managed object identifier of the set of managed object identifiers, each filter operator object identifier of the set of filter operator object identifiers, and each generic value object identifier of the set of generic value object identifiers are included in the request message in an order, and
wherein the management agent is operable to identify a respective filter value associated with each generic value object identifier of the set of generic value object identifiers, to identify a respective filter operator associated with each filter operator of the set of filter operator identifiers specified in the request message, and to combine the respective filter operators, the respective filter values, and the managed object identifiers into the at least one filter criterion based on the order.

12. The network device of claim 8, wherein the management agent is operable to filter the set of managed object values retrieved from the MIB by at least applying the at least one filter criterion to each managed object value of the set of managed object values to exclude managed object values that do not satisfy one or more of the at least one filter criterion.

13. The network device of claim 8, wherein the management agent is operable to retrieve managed object values that satisfy one or more of the at least one filter criterion from the MIB.

14. The network device of claim 8, wherein the request message further includes a set of generic value object identifiers, and wherein each generic value object identifier of the set of generic value object identifiers comprise a value encoded in accordance with basic encoding rules (BER) encoding.

15. A computer-readable storage medium encode with instructions that cause one or more programmable processors of a network device to:
receive, from a device management system, a request message, wherein the request message includes a set of managed object identifiers and a set of filter operator object identifiers, wherein the request message comprises one of a simple network management protocol (SNMP) GET, GETNEXT, or GETBULK command, and wherein each of the set of filter operator object identifiers specifies one of a mathematical operator, an equality operator, a bitwise operator, and a logical operator;
generate at least one filter criterion based on the set of managed object identifiers and the set of filter operator object identifiers;
receive a set of managed object values stored in a management information base (MIB) of the network device based on the set of managed object identifiers, wherein each managed object value of the set of managed object values corresponds to a respective managed object identifier of the set of managed object identifiers specified in the request message;
generate a response message based on the set of managed object identifiers specified in the request message and the retrieved set of managed object values, wherein each managed object value included in the response message satisfies one or more of the at least one filter criterion; and
send the response message to the device management system.

16. A method comprising:
generating, with a device management system, a Simple Network Management Protocol (SNMP) request message, the request message including one or more filter operators and one or more managed object identifiers, wherein the SNMP request message comprises one of an SNMP GET, GETNEXT, or GETBULK command, and wherein each of the set of filter operator object identifiers specifies one of a mathematical operator, an equality operator, a bitwise operator, and a logical operator;
sending, to a managed device, the SNMP request message;
receiving, with the device management system and from the managed device, an SNMP response message, the SNMP response message including values associated with at least one of the one or more operational object identifiers, wherein the values satisfy the one or more filter operators included in the request message; and
storing the received values in a data repository of the device management system.

17. The method of claim 16, wherein generating the SNMP request message comprises:
encoding each of the one or more filter operators within variable bindings of the request message as if the filter operators are standard configuration information variable bindings.

18. The method of claim 16, further comprising:
receiving, with the device management system, information from an operator, the information specifying at least the one or more filter operators and the one or more managed object identifiers,
wherein generating the SNMP request message comprises encoding the one or more filter operators and the one or more managed object identifiers in variable bindings of the request message.

* * * * *